Nov. 12, 1963  W. D. BACHMANN  3,110,633
TEMPERATURE-SUSTAINING APPARATUS FOR AUTOMOBILES
Filed May 3, 1961 2 Sheets-Sheet 1

INVENTOR.
Woodward D. Bachmann
BY
Dike, Thompson, Bronstein & Mrose
ATTORNEYS

Nov. 12, 1963   W. D. BACHMANN   3,110,633
TEMPERATURE-SUSTAINING APPARATUS FOR AUTOMOBILES
Filed May 3, 1961   2 Sheets-Sheet 2

INVENTOR.
Woodward D. Bachmann
BY
Dike, Thompson, Bronstein & Mrose
ATTORNEYS

United States Patent Office 3,110,633
Patented Nov. 12, 1963

3,110,633
TEMPERATURE-SUSTAINING APPARATUS FOR AUTOMOBILES
Woodward D. Bachmann, Boston, Mass.
(1177 Commonwealth Ave., Allston 34, Mass.)
Filed May 3, 1961, Ser. No. 107,577
7 Claims. (Cl. 136—161)

The present invention relates to improvements in storage and release of thermal energy and, in one particular aspect, to novel and improved electric battery equipment for vehicles in which high efficiency is maintained through unique controlled accumulation of energy in a storage medium of relatively small bulk.

As is well understood in the storage battery art, the operating efficiency of such electrochemical devices tends to drop to very low levels at temperatures below freezing. For example, adverse effects of severe winter temperatures will commonly reduce automobile storage battery efficiencies to as little as 40% of their optimum efficiency under warmer conditions. In the case of automobiles, there are other notorious cold-weather starting problems as well, principally due to increased frictions resulting from ineffective cold lubricants and to improper vaporization of cold fuel, and the reductions in battery efficiency are thus experienced at the most critical times when high power outputs would be most advantageous. Heretofore, it has been proposed that auxiliary heaters be used to maintain above-freezing temperatures, but with the obvious disadvantages attending the installation, fueling and operation of an accessory heating system. According to the present teachings however, the thermal wastes of an internal combustion engine installation are instead employed to preserve electric battery temperatures near optimum values over relatively long periods of time, without overheating, without introducing inordinate bulk of insulation and heat sink materials, and without complex plumbing.

It is one of the objects of the present invention, therefore, to provide novel and improved electric storage battery apparatus which maintains high efficiency over relatively long periods while ambient temperatures are relatively low.

A further object is to provide improved electric storage battery assemblies of relatively small bulk and low manufacturing cost in which the release of stored thermal energy is directed through cell electrolyte and electrode structure to sustain good operating efficiency.

By way of a summary account of practice of this invention in one of its aspects, there is provided a storage battery of generally conventional construction, such as the well-known multi-cell lead storage battery, except that the usual insulation about the electrolyte and cell assembly is permitted to have relatively good thermal conductivity characteristics. Surrounding this assembly about all except its top side is a double-walled hollow container filled with a mass which is in a normally liquid state at temperatures above about 90° F. and which becomes crystalline with negligible expansion as its temperature drops below that level. In turn, the surrounding container is itself jacketed by walls of a thermally-insulating casing which both obstructs the passage of thermal energy into and out of the container through its walls. Within the double-walled container, and in intimate heat-exchange relationship with its contents, is a heating element which is preferably coiled and sinuous such that substantially all parts of the mass within the container are within its influence. Further, a temperature detector is located within the container and is connected to sense the temperature of its contents and to exercise a control over an external source of energy which prevents excessive heating which could be quickly destructive of the associated storage battery. A relatively good thermal conductivity path is preserved between the container and the storage battery cells which it surrounds, whereby the storage battery has available a large quantity of thermal energy from the substance within the container while the ambient temperatures are at very low values and while the external source of energy is passive or exhausted. Such an external source may comprise the electrical generator or liquid coolant of an automotive vehicle, which are unable to supply or develop heat whenever they are stopped for long periods. The substance within the container is of a composition and mass which make available the quantity of heat needed to preserve the battery at a temperature promoting good efficiency throughout the usual overnight stand of vehicles, for example.

Although the features of this invention which are believed to be novel are set forth in the appended claims, details as to its organization and method of operation, together with the further objects and advantages thereof, may best be understood through reference to the following description taken in connection with the accompanying drawings, wherein:

FIGURE 1 is a top view of a typical automobile engine and battery installation in which the teachings of this invention may be practiced to advantage;

FIGURE 2 provides a partly cut away pictorial representation of an improved temperature-sustaining storage battery unit;

Figure 5:
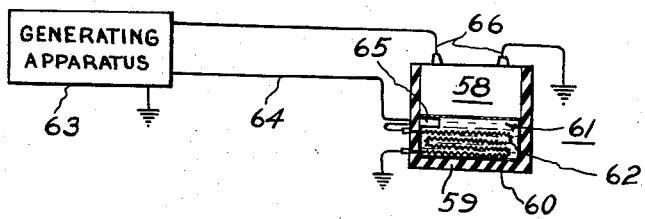
Figure 6:
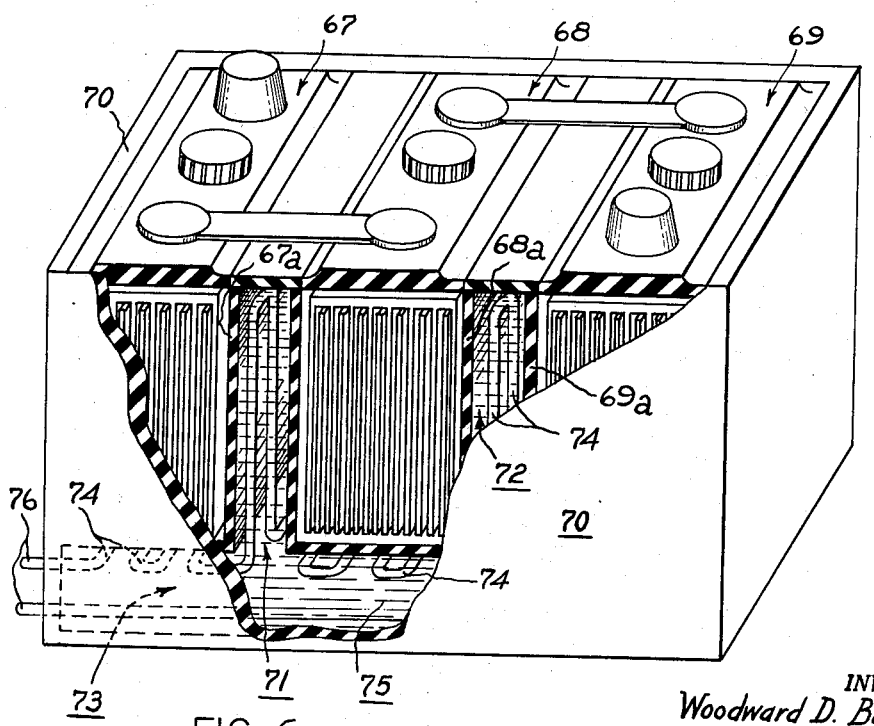

FIGURE 5 provides a circuit diagram of an electrically-supplied storage battery in which the present invention is practiced; and FIGURE 6 represents an alternative construction of an improved temperature-sustaining storage battery, in a cut-away pictorial view.

Figures 1, 2, 3:
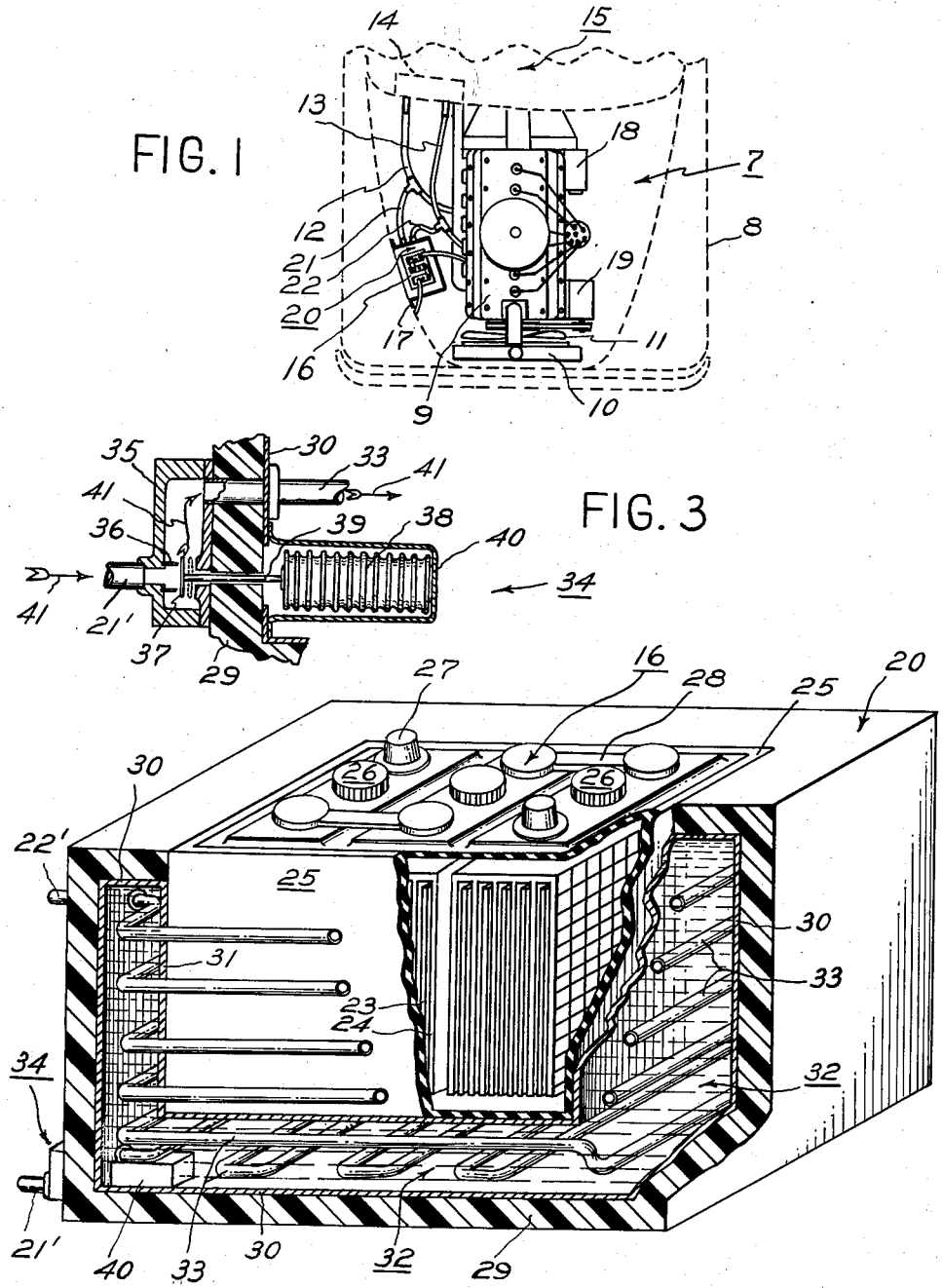
FIGURE 3 is a detail, partly in cross-section of a thermal control device employed in liquid-circulated heating of the battery illustrated in FIGURE 2.

In the installation depicted in FIGURE 1, contents of a common type of automobile engine compartment 7 are shown in relation to the dashed-line outline 8 of part of an automotive vehicle. Internal combustion engine 9 is of a water-cooled construction involving a radiator 10, engine-driven fan 11, and various internal and external fluid-circulating conduits such as the rubber hose connections 12 and 13 serving a heater 14 within the cab 15. A storage battery 16 is also mounted within the engine compartment in a bracket 17, and performs the usual function of supplying energy to a starter motor 18 and to other electrical equipment, as needed, while receiving regulated charges from the generator 19 whenever the engine is operated. The battery 16 is recessed into a special temperature-sustaining receptacle 20, disclosed in greater detail in FIGURE 2, and this container is shunted across a coolant circulation path by way of the hose connections 21 and 22 joined with T fittings in the heater connections 12 and 13.

The cut-away view of storage battery 16 in FIGURE 2 exposes the interleaved stack of plates 23 and 24 suspended within the casing 25, the illustrated assembly being of a standard type such as that including three lead storage cells consisting of positive plates of lead dioxide and negative plates of spongy lead, both immersed in a sulfuric acid electrolyte filling the non-corrosive casing 25. The usual filler caps 26, electrical terminals 27, and cell connecting straps 28 are shown at the top of the battery. Battery receptacle 20 is in two principal parts: the outermore jacketing 29 of thermal insulation material; and an inner double-walled container 30. At least the inner wall 31 of the container is fabricated of a material, such as metal, which readily transmits heat, i.e. possesses a high thermal conductivity, and the entire container is conveniently made of metal, as shown. Container 30 is shaped to serve as a close-fitting receptacle for a standard-size battery 16, for the purpose of promoting an efficient low-loss flow of thermal energy to the battery from the container on all sides except the exposed top, in accordance with principles discussed hereinafter. Preferably, the spacing between walls of the double-walled container is greater at the bottom, on which the battery normally rests, than about the sides surrounding the sides of the generally cubic battery. The latter constructional feature assures that a larger mass of the special substance 32 filling the double-walled hollow container is at the bottom, from whence the paths of escape of heat to the ambient atmosphere are principally through the superpositioned battery, as desired. Substance 32 is preferably sodium sulfate ($Na_2SO_4.10H_2O$), which advantageously changes between solid and liquid states at about 90° F., which is known to be a temperature at which storage battery efficiency is high and at which large power outputs are available for starting purposes, for example. As is well understood, the heat of fusion and heat of solidification of substances are very significantly larger than their thermal capacities (or specified heats), and, based on this fact, the mass or quantity of substance 32 which is required to store and release heat to battery 16 can be kept very small in relation to heat sinks in which thermal capacity alone is exploited. Once this substance is liquefied and raised to some temperature above 90° F. which is yet not above a safe temperature insofar as deterioration of the battery is concerned (about 120° F.), the battery and heat storage solution 32 cannot be lowered in temperature below 90° F. until each gram of the substance has become crystallized or "frozen" by releasing 57.1 calories to the adjacent battery. This storage preserves the battery at the desirable and substantially optimum temperature of 90° F. for extended periods while no auxiliary heating is to be had. Provided that the jacketing 29 of external insulation is a highly effective one, as little as one-quarter of a cubic foot of the preferred substance 32, i.e. about 25 pounds, suffices to preserve a 50-pound storage battery at good operating efficiency for about 24 hours in a sub-freezing ambient environment. Where the insulating jacket 29 is not a highly effective one, or where exceedingly low temperatures are encountered, one-half cubic foot of the sodium sulfate storage medium suffices to maintain the desired efficiency, without an excessive addition of weight to the vehicle.

Sodium sulfate ($Na_2SO_4.10H_2O$) is a preferred heat-storage medium in the improved temperature-sustaining equipment not only because of its highly advantageous freezing and melting point but also because it expands and contracts negligibly in changing between liquid and crystalline states, is not highly corrosive, and is plentiful at relatively low cost. However, it should be understood that other substances will have like augmented heat-storage characteristics over the temperature range of interest, about 65° F. to 110° F., and may be substituted with comparable effects. By way of example, other suitable materials include calcium chloride ($CaCl_2.6H_2O$) having a melting point at about 86° F., dibasic sodium phosphate ($Na_2HPO_4.12H_2O$) melting at about 94° F., and calcium nitrate ($Ca(NO_3)_2.4H_2O$) which melts at about 109° F.

The heat-storage substance 32 is brought from a crystalline to a liquid state, and thereby possesses the desired energy content which will preserve a battery efficiency for desired periods of time, only after the needed heat of fusion has been supplied from an external source. In the FIGURE 2 embodiment, this heat must be received from the outside almost exclusively by way of the heating coil 33 which has the illustrated sinuous and helical turns reaching near to all parts of the substance 32 filling the double-walled container 30. Although there is ambient heat present in the engine compartment 7 during operation of the supporting vehicle, very little of this can reach substance 32 directly, because of the insulated jacketing 29, the latter being necessary to prevent the stored heat from escaping from the container 30 other than through the battery. Exterior surfaces of the coil 33 are preferably of metal having good thermal conductivity, such that heat is quickly transferable to the substance 32. As shown in this embodiment, the turns of coil 33 are of hollow tubular form and extend between sealed hose pipe connections 21' and 22' through which hot coolant fluid from the vehicle engine cooling system may be circulated under control of a thermostatic regulator 34. As the vehicle is operated, developing waste heat in its cooling system, the coolant, such as a water and antifreeze solution, is circulated through coil 33 and imparts its thermal energy to the substance 32. When all of the heat-storage substance has been converted from crystalline to liquid form, at 90° F., its temperature is then permitted to be further increased until it reaches slightly more than about 110° F., whereupon the regulator 34 detects the high temperature and interrupts the coolant flow through the battery assembly. It is generally conceded that battery temperatures above about 120–125° F. are likely to be destructive, and it is for this reason that the regulator 34 operates to forestall the occurrence of heat storage at such levels.

As is portrayed in FIGURE 3, a suitable temperature detector and flow control unit, 34, may be of a simple and diminutive construction. Inlet pipe connection 21' there enters a hollow valve body 35, on the exterior of the assembly, in which the cylindrical seat 36 is opened and closed by a movable valve member 37. The latter is positioned by the output shaft 39 of an expansible and contractible sealed fluid-filled bellows unit 38 which is disposed within the insulated double-walled container 30 in a small sealed casing 40. Temperatures of solution 32 in excess of a predetermined maximum, such as 110° F., are sensed by bellows unit 38 which then expands and thrusts the valve disk 37 against seat 36 to prevent further circulation of coolant and further heating of substance 32. Lowered temperature induces the reverse actions, whereupon the coolant fluid circulation is then again effective to raise the temperature of substance 32. Bellows unit 38 is preferably enclosed in casing 40, as shown, to avoid the restraints which would be imposed by the substance 32 in its crystalline state. Arrows 41 designate the path of coolant circulation through the regulator.

Figure 4:
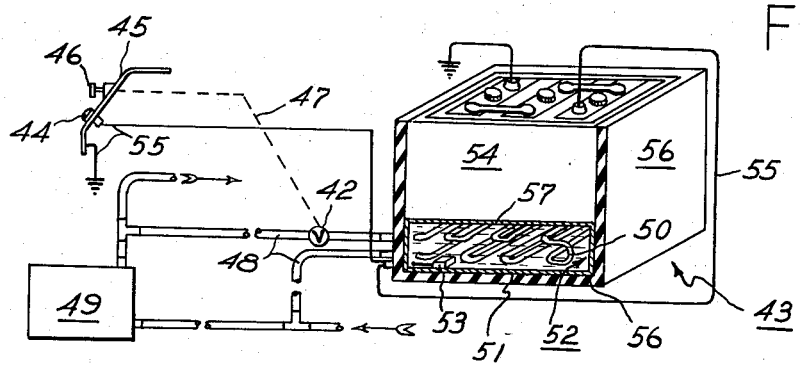
FIGURE 4 is a system diagram of improved temperature-sustaining apparatus in an automotive vehicle installation.

Manual actuation of a control valve 42 interrupts coolant flow through the temperature-sustaining battery assembly 43 in FIGURE 4. Need for closing of this value is signalled to an operator by an electrical alarm 44, shown in the form of a signal light mounted on an automobile dashboard 45. Valve-actuating knob 46 is mounted on the same dashboard and is connected in actuating relationship to the control valve 42 by a coupling 47. Valve 42, which is of a conventional construction, is serially connected in the piping 48 which connects the battery assembly in a shunted relationship to the automobile heater 49. Fluid flow through the heater 49 therefore remains substantially independent of the flow through the battery assembly coil 50. A hollow metal container 51 is filled with a temperature-sustaining storage medium 52, with which the sinuous two-layer heater coil 50 is in a good heat-exchange relationship. Electrical thermostate 53 is also disposed within the hollow container to sense the temperatures of the heat-storage medium and to close switching contacts which will cause the battery 54 to illuminate the signal lamp 44 by way of the circuit wiring 55 whenever the maximum permissible battery temperature is approached. For these purposes, thermostat 53 is preferably a simple bimetal switch. Storage battery 54 is held closely within the temperature-sustaining receptacle which includes the heat-insulating casing 56 and the hollow metal container 51. At least the upper wall 57 of container 51 is made of a material having a good thermal conductivity, whereby virtually all of the heat stored in medium 52 is released upwardly through the battery 54 where it is needed. Insulating casing 56, like jacketing 29, may be of a plastic or hard rubber heat-insulating composition, or, for greater insulating efficiency, may be constructed along lines of the well-known vacuum bottle, although at higher cost. A removable cover (not shown) of heat-insulating material may also be provided.

The apparatus illustrated in FIGURE 5 similarly includes a known form of storage battery 58 set into an accommodating recess within a heat-insulating receptacle 59 and atop the metal container 60 filled with a heat-storage substance 61. In this embodiment, however, an electric heater coil 62 is disposed within the container and in good heat-exchange relationship with the heat-storage substance. The heater coil may be of the well-known sheathed type, or may instead be formed by exposed heater wires. Coil 62 is electrically connected in circuit with the automotive vehicle generating apparatus 63 by wiring 64, serially through a protective thermostat 65. The latter, which may be a simple bimetal-switch thermostat, is disposed within container 60 and serves to interrupt supply of electric current to heater coil 62 whenever the temperature of the heat-storage substance approaches a level which is known to be destructive to the storage battery. Generating apparatus 63 may include a D.-C. generator or an alternator producing an alternating current output. The same apparatus, with suitable known types of electrical regulators, also serves to supply charging currents to the battery terminals, by way of the cables 66.

The embodiment in FIGURE 6 represents a storage battery and heat-storage assembly manufactured as an integral unit. Three storage battery cells, 67–69 are depicted, serially connected electrically but physically spaced apart and each separately encased within a container for its electrolyte and plates, designated 67a–69a, respectively. Insulating casing 70, which may be of the customary electrical and heat insulating compositions employed in battery constructions, supports these three cells in the illustrated spaced apart relationship, with the two gaps 71 and 72 between the cells and with a further hollow compartment 73 below them. Heater coil 74 is wound sinuously through the lower hollow compartment and through each of the gaps between cells, to establish itself in good heat-exchange relationship with the heat-storage substance 75 filling all of the unoccupied spaces within the casing 70. Substance 75 is of the same character as those heat-storage substances earlier referred to, and its effects are substantially the same in preserving the cell temperatures at near optimum value for desired long periods of time. Sealed connections 76 serve to couple the needed energy into the heater coil 74, either electrical or thermal, depending upon whether the coil is of the type conducting electricity or hot liquid coolant.

It should be understood that the specific embodiments of the invention herein disclosed are of a descriptive rather than a limiting nature, and that various changes, combinations, substitutions or modifications may be employed in accordance with these teachings without departing either in spirit or scope from this invention in its broader aspects.

What I claim as new and desire to secure by Letters Patent of the United States is:

1. Temperature-sustaining storage battery apparatus for vehicles, comprising at least one storage battery cell including plates and electrolyte within a casing, a quantity of a heat-storage substance which has a freezing and melting point at a temperature near the temperature of optimum efficiency of said cell, container means supporting said substance in an adjacent heat-exchange relationship with said casing of said cell, heat-insulating means jacketing said container and opposing release of heat therefrom except through said cell, at least one heater coil within said container in heat-exchange relationship with said substance, and means for applying energy to said heater coil when the engine of said vehicle is operating, whereby to heat said coil and elevate the temperature of all of said substance above said freezing and melting point.

2. Temperature-sustaining storage battery apparatus for vehicles, comprising at least one lead storage battery cell including plates and electrolyte within a casing, a quantity of sodium sulfate having a freezing and melting point at about 90° F., container means supporting said sodium sulfate in an adjacent heat-exchange relationship with said casing of said cell, heat-insulating means jacketing said container and opposing release of heat therefrom except through said cell, at least one heater coil within said container in heat-exchange contact with said sodium sulfate, means for applying energy to said heater coil only when the engine of said vehicle is operating, whereby to heat said coil and raise the temperature of all of said sodium sulfate to a temperature above about 90° F. at which said sodium sulfate is in a liquid state, and thermostat means responsive to the temperature of said sodium sulfate interrupting the supply of energy to said heater coil by said means applying energy when the temperature approaches about 120° F.

3. Temperature-sustaining storage battery apparatus as set forth in claim 2 wherein said heater coil comprises hollow tubing for conducting liquid, wherein said means applying energy comprises means circulating heated liquid coolant from a cooling system of the engine of said vehicle through said tubing, and wherein said thermostat means includes a valve connected in series with said tubing and a temperature-responsive unit for mechanically closing said valve when the temperature of said sodium sulfate approaches about 120° F.

4. Temperature-sustaining storage battery apparatus for vehicles, comprising a storage battery assembly including a plurality of series-connected cells each having plates and electrolyte confined within casing means, a quantity of a heat-storage substance which has a freezing and melting point at a temperature near the temperature of optimum efficiency of said cells, container means supporting said substance in an adjacent heat-exchange relationship with said casing means for said cells, said container means including heat-insulating means opposing release of heat therefrom except through said cell, at least one heater coil within said container in heat-exchange relationship with said substance, means for applying energy to said heater coil only when the engine of said vehicle is operating, whereby to heat said coil and elevate the temperature of all of said substance above said freezing and melting point, and thermostat means responsive to the temperature of said substance interrupting the supply of energy to said heater coil by said means applying energy when the temperature of said substance approaches a predetermined maximum operating temperature for said cells.

5. Temperature-sustaining storage battery apparatus as set forth in claim 4 wherein said casing means comprises a plurality of spaced casings each containing a separate one of said cells, wherein said container means and casing means together form liquid-tight storage spaces below and between said cells, and wherein said heater coil extends below and between said cells in said storage spaces.

6. Temperature-sustaining storage battery apparatus as set forth in claim 4 wherein said container means comprises a hollow double-walled container filled with said substance and a heat-insulating jacket about said container, said container and heat-insulating jacket forming a hollow receptacle into which said storage battery assembly may be recessed, said container being disposed in underlying relationship to said storage battery assembly.

7. Temperature-sustaining storage battery apparatus as set forth in claim 6 wherein said substance comprises sodium sulfate, said battery apparatus comprises lead storage cells, and wherein said thermostat means interrupts the supply of energy to said heater coil when the temperature of said sodium sulfate approaches about 120° F.

References Cited in the file of this patent

UNITED STATES PATENTS

| | | |
|---|---|---|
| 2,440,369 | Furman | Apr. 27, 1948 |
| 2,666,091 | Martin et al. | Jan. 12, 1954 |
| 2,677,664 | Telkes | May 4, 1954 |
| 2,827,438 | Broadley | Mar. 18, 1958 |
| 2,936,741 | Telkes | May 17, 1960 |